United States Patent
Axelsson

(10) Patent No.: US 6,228,409 B1
(45) Date of Patent: May 8, 2001

(54) METHOD OF PRODUCING CONSUMER MILK WITH A DEFINED FAT CONTENT IN PACKAGES

(75) Inventor: Karl-Gunnar Axelsson, Dalby (SE)

(73) Assignee: Tetra Laval Holdings & Finance SA, Pully (CH)

( * ) Notice: Subject to any disclaimer, the term of this patent is extended or adjusted under 35 U.S.C. 154(b) by 0 days.

(21) Appl. No.: 08/392,854

(22) PCT Filed: Sep. 16, 1993

(86) PCT No.: PCT/SE93/00753

§ 371 Date: Apr. 13, 1995

§ 102(e) Date: Apr. 13, 1995

(87) PCT Pub. No.: WO94/06303

PCT Pub. Date: Mar. 31, 1994

(30) Foreign Application Priority Data

Sep. 17, 1992 (SE) .................................................... 9202689

(51) Int. Cl.⁷ ..................................................... A23C 9/15
(52) U.S. Cl. ........................ 426/397; 426/231; 426/388; 426/392; 426/399; 426/400; 426/491
(58) Field of Search .................................... 426/231, 232, 426/491, 392, 397, 399, 400, 401, 388

(56) References Cited

U.S. PATENT DOCUMENTS

| | | | | |
|---|---|---|---|---|
| 1,157,976 | * | 10/1915 | Davis .................................. | 426/399 |
| 2,264,665 | * | 12/1941 | Hall ..................................... | 426/491 |
| 2,512,513 | * | 6/1950 | Zahm .................................. | 426/400 |
| 2,642,363 | * | 6/1953 | Moeri .................................. | 426/399 |
| 2,776,213 | * | 1/1957 | Borg .................................... | 426/231 |
| 3,212,674 | * | 10/1965 | Martin ................................. | 426/399 |
| 3,946,113 | * | 3/1976 | Seiberling ........................... | 426/231 |
| 3,961,570 | | 6/1976 | Sanden . | |
| 3,970,763 | * | 7/1976 | Moran .................................. | 426/399 |
| 3,983,257 | | 9/1976 | Malmberg et al. . | |
| 4,017,643 | * | 4/1977 | Lester .................................. | 426/231 |
| 4,074,622 | * | 2/1978 | Niemeyer ............................ | 426/231 |
| 4,075,355 | | 2/1978 | Pato . | |
| 4,144,804 | * | 3/1979 | Okeefe ................................ | 426/231 |
| 4,145,450 | * | 3/1979 | Winder et al. ...................... | 426/231 |
| 4,233,320 | * | 11/1980 | Monaco et al. ..................... | 426/414 |
| 4,522,015 | * | 6/1985 | Nildebolt ............................. | 426/399 |
| 4,534,991 | * | 8/1985 | Kryger ................................ | 426/399 |
| 4,741,911 | * | 5/1988 | McIntyre et al. ................... | 426/407 |
| 5,137,738 | * | 8/1992 | Wynn .................................. | 426/231 |
| 5,260,079 | * | 11/1993 | Zettier et al. ....................... | 426/231 |

FOREIGN PATENT DOCUMENTS

| | | | | |
|---|---|---|---|---|
| 602019 | | 7/1978 | (CH) . | |
| 1666023 | * | 7/1991 | (SU) .................................. | 426/231 |

OTHER PUBLICATIONS

Milchwissenschaft 1992, 47(7) 438–441 426/399 (Dialog Abstract).*
Voedingsmiddelentechnologie vol. 11(12) p. 10–11 426/397 1978 (Dialog Abstract).*
Ceskoslovenska Hygiena vol. 25(6/7) p. 340–345 426/410 1980.*
Dairy Field vol. 171(3) p. 24 26, 28–29, 426/399 1988.*

* cited by examiner

*Primary Examiner*—Steven Weinstein
(74) *Attorney, Agent, or Firm*—Fish & Richardson P.C.

(57) ABSTRACT

Consumer milk with a defined fat content packed in packages is produced by mixing two fractions consistng of milk products with different fat content. One of the fractions has a fat content below the required fat content of the consumer milk to be produced, while the other has a fat content above the required fat content of the consumer milk. The mixing of the two fractions takes place immediately prior to, or during, the filling of the consumer milk in packages.

5 Claims, No Drawings

METHOD OF PRODUCING CONSUMER MILK WITH A DEFINED FAT CONTENT IN PACKAGES

FIELD OF THE INVENTION

The present invention relates to production of consumer milk with a defined fat content packed in packages.

BACKGROUND OF THE INVENTION

On the market there is today a number of milk products with different fat content packed in packages. In Sweden there is for example minimum milk 0.1% fat, light milk 0.5% fat, "middle" milk 1.5% fat and "standard" milk 3.0% fat. Abroad there are products with other fat contents. The fat content given on the packages must be kept and production of milk with a certain, guaranteed fat content, usually called standardization of milk, is therefore an important process step in a dairy.

The standardization process has hitherto been carried out according to two different methods, batch-wise in tanks or by direct in-line standardization. The first step according to both these methods is to separate whole milk into cream and skimmilk. The term "whole" milk or raw milk is used for milk as it is delivered to the dairies with a fat content around 4%.

When carrying through the standardization in batches two methods are used, namely pre-standardization and post-standardization. The pre-standardization means that the milk is standardized prior to the pasteurization. When the milk shall be standardized to a fat content higher than the fat content in the raw milk, cream is mixed with the milk in proportions which shall give the desired fat content. If the standardization shall take place to lower fat content, the raw milk is diluted with skimmilk. The standardized milk is pasteurized after analysis of the fat content and a possible correction of the same.

Post-standardization means that pasteurized milk is mixed with cream or skimmilk depending on if the fat. content shall be adjusted upwards or downwards in the same way as practiced for the pre-standardization. Some risks for re-infection are present since post-standardization means mixing of already pasteurized products. Both methods demand large tanks and analysis and a possible correction of the fat content is labour-intensive.

The second method, direct-standardization, has therefore been an attractive alternative for many years. According to this method the fat content is adjusted to the required level by remixing a certain amount of the cream obtained from the separator with skimmilk also obtained from the centrifugal separator. This remixing takes place in the skimmilk pipeline connected to the skimmilk outlet from the centrifugal separator.

The pasteurization usually takes place in connection with the standardization. Whole milk is preheated to a temperature suitable for the separation of the cream from the skimmilk. The standardized milk that is obtained after the remixing of suitable amounts of cream and skimmilk after passage of the centrifugal separator is then heated and pasteurized.

Many methods which make an automatic direct-standardization of the milk possible has been developed and are today operating in a number of dairies.

The methods described above are used for manufacture of milk with a preselected fat content. A desired amount of milk is produced. If milk with another fat content should be produced, the system must be adjusted to new preset values and volumes.

The different milk products with a varying fat content mentioned above may be produced by in-line standardization. The packaging does not take place immediately after the standardization but the milk products are intermediately store in large tanks in the dairy. Usually, different kinds of consumer milk are packaged firstly when the distributors working on the market have delivered their orders for a suitable amount of packages of consumer milk with differing fat content.

SUMMARY OF THE INVENTION

According to the invention there is now proposed a method of producing consumer milk with a defined fat content packed in packages, which method fundamentally diminishes the number of storing tanks for prepared milk products earlier needed. The method according to the invention is mainly characterized in that two fractions comprising milk products, but with different fat contents, are mixed. One of the fractions has a fat content below the required fat content of the consumer milk to be produced while the other has a fat content above the required fat content of the consumer milk to be produced. The mixing takes place immediately prior to, or during the filling of the consumer milk in packages.

DETAILED DESCRIPTION

The partial streams containing the two milk fractions are well miscible.

According to the method of the invention it is possible to rapidly switch between production of consumer milk with different fat contents with one and the same equipment without any risks for losses of valuable product.

The method according to the invention is with advantage carried out in that the mixing of the two fractions takes place in the package by supplying predetermined amounts of the two fractions to the package.

If considered suitable, the mixing of the two fractions takes place immediately prior to the filling in the package in a separate mixing step in the filling machine by mixing of predetermined amounts of the two fractions corresponding to the size of the package or some multiple of the same.

If the mixing shall take place in the package, it is suitably carried out in such a way that the two fractions are simultaneously dosed into the package by means of two dosing devices. Of course, it is possible to dose first one and then the second fraction into the package instead by actuating one dosing device after the other.

The different fractions may also be added in such a way that one dosing device is used for one fraction, suitably the more fat rich one after which the package is moved to a new position and another dosing device, where the second fraction is added.

The mixing of the two fractions may also take place in a pipeline leading to the filling machine or within the same.

The two fractions which are mixed may consist of milk products usually produced in the dairy. Normally, there is skimmilk available. The fat content of the same varies with the use of separation equipment and is usually in the interval 0.05–0.08%. If suitable, light milk (0.5% fat) may constitute the fraction with the lower fat content instead. Coffee cream or cooking cream with approx. 12% fat content may be used as the fraction with the higher fat content, but it may also be suitable to use whole-milk, i.e. milk with a natural fat content which only has been homogenized. The dosing is preferably carried through in such a way that the fraction with the highest fat content is dosed into the package at first. It is also possible to supply one fraction continuously and the other in an intermittent way.

According to the method of the invention it is possible, as mentioned earlier, to make great savings in that a number of storing tanks with matching supplying equipment for standardized but not packaged product may be avoided. The additional equipment only consists of a further dosing device.

When milk products are filled into packages, this usually takes place with some system available on the market. A product may be filled by means of a filling pipe which is lowered into the package in such a way that the filling takes place under the level of liquid. If such a filling system is used, a mixing of the two fractions may take place in-line in immediate connection to the filling pipe.

The filling may take place by means of a controlling valve giving a constant flow after which the package is closed. Also here the mixing of the fractions takes place immediately prior to the filling in the package, preferably in a separate mixing unit holding mainly the same volume as the package or with a somewhat larger volume.

Other filling systems use metering pistons feeding a certain volume of product to the package, after which the package is closed. In such a case the mixing of the two fractions usually takes place directly in the package. The filling machine is either supplied with an extra metering piston for the second fraction, or the same dosing device is used for both fractions, as described above.

Instead of using a metering piston a positive pump may be used for the the dosing.

What is claimed is:

1. Method of producing and packaging a standardized consumer milk product having a predetermined fat content in the package which comprises the steps of:
    (a) selecting two milk fractions having different fat contents, one of said fractions having a fat content below said predetermined fat content and the other having a fat content above said predetermined fat content; and
    (b) separately filling predetermined amounts of said two milk fractions into said package, either sequentially or simultaneously, causing mixing of said two milk fractions directly in said package to produce a milk product in said package having said predetermined fat content.

2. Method according to claim 1, wherein the two fractions are dosed into the package simultaneously by means of two dosing devices.

3. Method according to claim 1, wherein the two fractions are dosed into the package by means of a common dosing device which at first doses one fraction, then the other.

4. Method according to claim 1, wherein the fraction with the lower fat content consists of skim milk, while the other fraction consists of cream.

5. Method according to claim 1, wherein the fraction with the lower fat content consists of skim milk, while the other fraction consists of whole milk.

* * * * *